Figure 1:
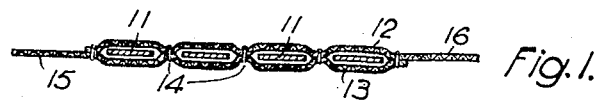

May 8, 1962 P. EISLER 3,033,970
ELECTRIC CONDUCTOR STRIPS
Filed July 8, 1958 3 Sheets-Sheet 1

INVENTOR
Paul Eisler
BY *A. E. O'Dell*
ATTORNEY

May 8, 1962 P. EISLER 3,033,970
ELECTRIC CONDUCTOR STRIPS
Filed July 8, 1958 3 Sheets-Sheet 2
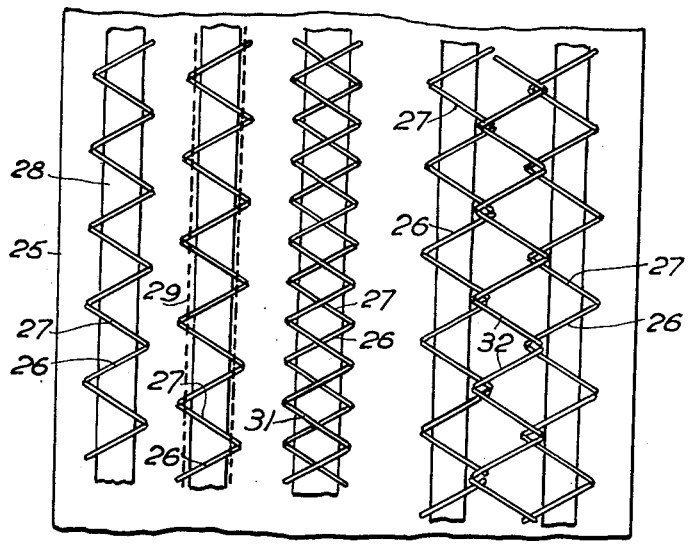
Fig. 4.
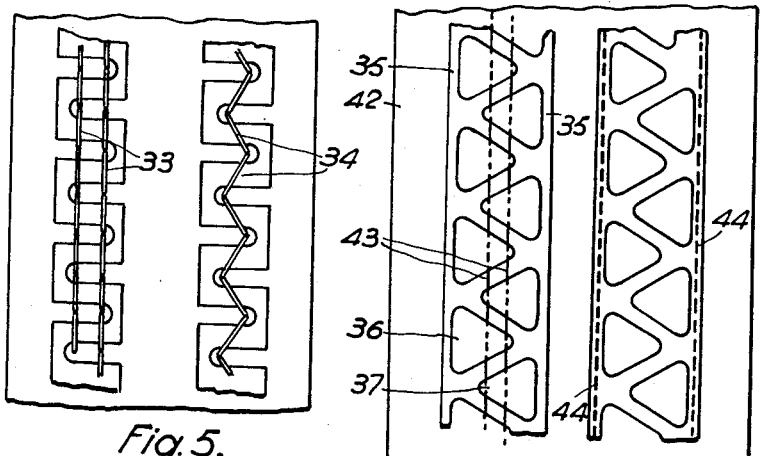
Fig. 5. Fig. 6.
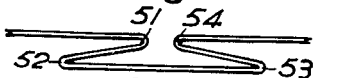
Fig. 7.
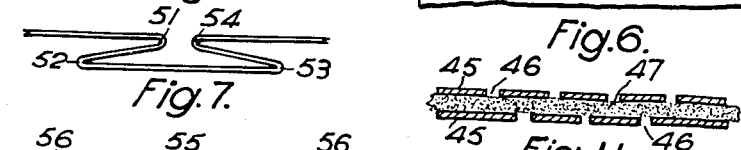
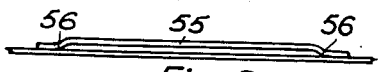
Fig. 8.
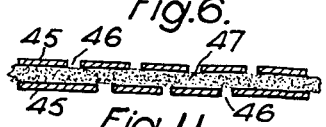
Fig. 11.
INVENTOR
Paul Eisler
BY
ATTORNEY May 8, 1962 P. EISLER 3,033,970
ELECTRIC CONDUCTOR STRIPS
Filed July 8, 1958 3 Sheets-Sheet 3

INVENTOR
Paul Eisler
A. E. Odell
ATTORNEY

United States Patent Office 3,033,970
Patented May 8, 1962

3,033,970
ELECTRIC CONDUCTOR STRIPS
Paul Eisler, 57 Exeter Road, London NW. 2, England
Filed July 8, 1958, Ser. No. 747,315
Claims priority, application Great Britain July 8, 1957
15 Claims. (Cl. 219—46)

In order to utilize various known advantageous features of cables which are in the form of flat cables, a number of proposals have been made in the past for the solution of some of the problems connected with the subject. One of the most pertinent difficulties which must be overcome is the high cost of production, very often caused by the necessity of obtaining production equipment specially designed and made for the single purpose of cable production and by the high running cost of it.

The purpose of the present invention is to enable very convenient, easily obtainable and comparatively cheap existing equipment to be used for the production of a new type of flat cable, essentially a heating structure, which itself forms an integral part of the invention in all its various embodiments, together with the numerous applications of which it is an important means.

Multicore flat cables are known both with round wires or flat metal strips as conductors. Extrusion, printing and weaving techniques are used or proposed for the production of these cables. The multicore flat cables of the present invention also feature metal strips (usually flattened wires or strips of metal foil) as conductors. These strips are either flat or according to the present invention crimped (creased). They are bare or insulated by an enamel or plastic covering.

When in use the strips form the limbs of a meander pattern. This means that at each end of a unit length of cable alternate neighboring strips are interconnected by so-called bridges while two strips, generally the two at the edges of the cables, are either bus bars running through several or all unit lengths or are connected to supply terminals.

It will be clear that the cables or structures of the invention though of comparatively small width are not limited to any particular width though they will often be structures which can properly be referred to as tape cables or tapes by which it will be understood that their width does not exceed two inches. Hereinafter for convenience the invention will sometimes be described with reference to tape cables or tape without any limitation of the invention to such structures being implied.

The bridges may be integral with the strips or the strips have the bridges joined to them prior to the processing described hereafter. In respect of strips with such integral or prefabricated bridges between the strips the term cable only denotes the part between the two sets of bridges; even at these locations no handling of individual strips is possible and the whole pattern is fed through the processing in one piece. Disregarding the interior the expression multicore cable would correctly describe the whole length.

This term is still more applicable to the case of the type of heating structure which is produced either from single foil strips or from a row of parallel foil strips on a flexible support—a so-called tape cable—without integral or prefabricated bridges. This type is eventually cut into one or more unit lengths prior to its use as a heating structure, and bridges and terminals are formed from the cut ends of the parallel unconnected strips or are joined to them after this multicore cable has been cut. The invention includes methods and means to overcome the difficulties of finding where to cut the cable for producing a heating element of a desired resistance, of taking hold of the cut ends of the strips, of making the interconnections and terminations and of arranging and joining several heating elements into wide runners or large pads.

These features of the invention will be described later after the methods of producing the multicore cable stage of the heating structure using in the first instance single metal foil strips.

In order to produce the flat cables of the present invention these metal strips and one or two layers of insulating material (for instance, plastic films or fibrous textile tape made from cotton, nylon, terylene, or glass fiber) are fed through a multi-needle sewing machine which sews the metal strips and the insulating tape or tapes together so that adjacent metal strips are permanently and safely separated from each other by the stitches and the threads applied in the machine.

Multi-needle sewing machines are readily available, comparatively cheap and speedy. They are widely used in the textile industry for work on tapes and ribbons and lend themselves readily to fully automatic running. They can be made to stop when the thread breaks and to signal the need to feed them with fresh tape or thread. The seams made can be made in a variety of stitches and even ordinary glass fibres have been used successfully as the thread. (In the case of glass fibre threads, it is preferable to use resin—for instance nylon, epoxy or polyester resin—coated glass fibre threads. The resin coating reduces the rate of breakage of the glass fibre thread and therefore the frequency of stopping of the machine.)

Figure 2:
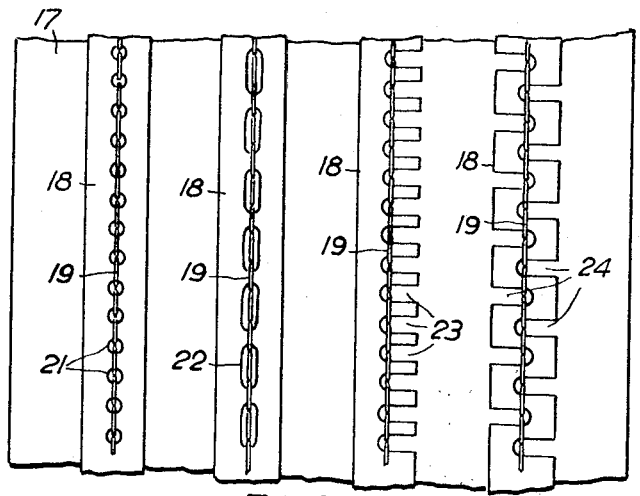
Figure 3:
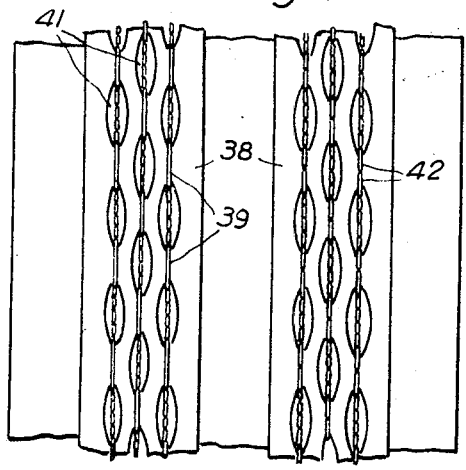
Figure 9:
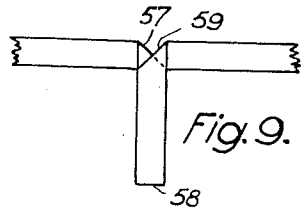
Figure 10:
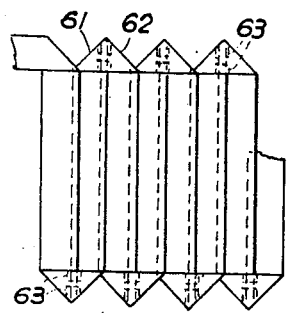
Figure 12:
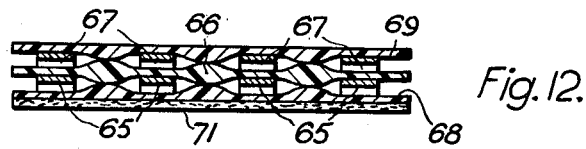
Figure 13:
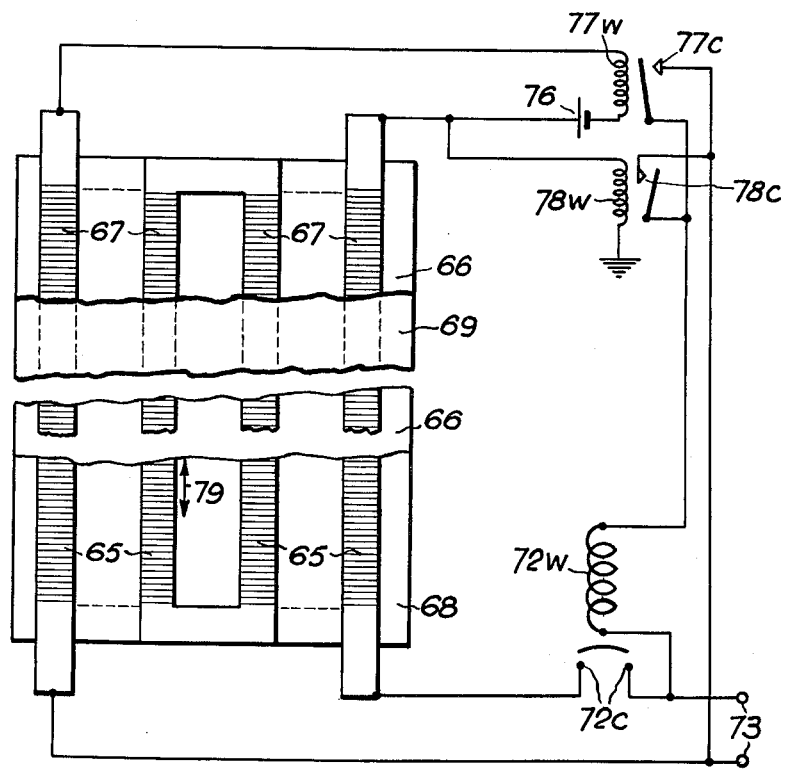

In the further description reference will be to the accompanying diagrammatic drawings in which:

FIGURE 1 is a cross section of a first form of heating structure according to the invention, FIGURE 2 is a plan view of a second form of heating structure incorporating several alternative forms of conductor, FIGURE 3 is a plan view of a third form of heating structure with two variations in the securing of the conductors, FIGURE 4 is a plan view of a fourth form of heating structure with four variations in the securing of the conductor, FIGURE 5 is a plan view of a modification of FIGURE 2, FIGURE 6 is a plan view of a structure having another alternative form of conductor, FIGURE 7 is a side view of a single conductor strip showing provision for making electrical connection without removing the insulation, FIGURE 8 is a side view of an alternative to FIGURE 7, FIGURE 9 is a plan view of means for making electrical connection to an outside strip conductor of a heating structure, FIGURE 10 is a plan view of a heating mat made up from the cable of the invention, FIGURE 11 is a transverse section of a composite conductor strip which can be used in the invention, FIGURE 12 is a cross section of another form of structure according to the invention, and FIGURE 13 is a plan view showing the structure of FIGURE 12 in use.

Referring first to the use of a multi-needle sewing machine and to FIGURE 1, it is a fairly straightforward matter to adapt the ordinary multi-needle sewing machine with $n$ needles to sew $(n-1)$ metal strips 11 in between two layers 12, 13 of insulating material—say two nylon or glass fibre tapes. The seams 14 run between the metal strips and outside the outermost and the stitches fix only the two insulating tapes together so that they form $(n-1)$ envelopes over the $(n-1)$ metal strips, with a solid seam between adjacent metal strips which are totally enclosed within the two insulating tapes.

It is necessary to arrange for the machine to be fed not only with the threads and two tapes from stock reels, but also the metal strips. It would be possible to couple existing multi-needle sewing machines with a foil slitting, or a wire flattening, or an enamelling machine in series so that an intermediary rewinding stage might be avoided. For heating tapes made with strips having integral or prefabricated interconnections (bridges) the sewing machine may form a last, or last but one stage in the production line for these flexible patterns without overcomplicating the production line. For the multicore cable stage of the production of heating tapes from single strips, on the other hand, it is preferable to avoid such complications and to provide $(n-1)$ stock reels for the metal strips already tested for compliance with technical requirements specified for them and ready to be enclosed within the two insulating tapes.

These tapes are preferably fed to the machine in a slightly staggered relation so that the bottom tape extends over the top tape on one edge 15 of the flat cable and the top tape over the bottom tape on the other edge as at 16 if both tapes are of equal width which is generally (but not always) the case. The overlapping edges enable two (or more) flat cables to be sewn together conveniently to provide a single cable of double (or multiple) width without increase of thickness at the joint(s). Such sewing together of two flat cables can be done in an ordinary single-needle sewing machine, and it is therefore even within the facilities of most households to make fabrics of any shape out of the standard width flat cable.

Instead of sewing two flat cables together a long flat cable can be folded at the centre of its length and the edges be sewn together except near the fold. It is also possible to stick or otherwise fix the overlapping tape edges together instead or in addition to sewing them together.

While it is often not desirable to complicate the working of the multi-needle sewing machine by coupling it to other machines ahead of it, as has been explained above it is sometimes desirable to feed the cable coming from it directly into an impregnating or coating machine or device or into a rewinding gear.

A different method must be used however for the production of flat cables with only one insulating layer 17 as in FIGURE 2 and the fixing of the metal strips 18 not within an enclosure of two layers between seams running between the metal strips, but on to a single layer by sewing them on. The stitches 19 of the seams made by straightforward working needles in this case go through the metal strips themselves or through perforations 21, slots (longitudinal 22 or lateral 23 all from the same side or 24 from opposite sides alternately) or other prefabricated metal-free areas within the metal strips. In order to keep the perforations and the stitches in register and guide the flimsy perforated or patterned metal strips the perforating tool or a pattern sensing device is preferably attached to the front of the multi-needle sewing machine.

A simple pattern sensing device is an electrical contact provided in the line of the seam at the place of the hole to be made by a needle a few stitches ahead. If the stitch is to be on a metal-free area, for instance through a perforation, an electric circuit through the contact and the strip must be open at the stitching time. If the pattern is out of register the circuit would remain closed and the current in the circuit can be made to stop the machine or lift a needle or group of needles by operating a suitable relay.

A similar sensing device can also be employed usefully when cables with integral interconnections are being produced and when it is not desired to pierce these interconnections by stitches. Multi-needle machines sewing such patterns, that is sewing cables in which as in FIGURE 3 the strips 38 and bridges 39 constitute a meander pattern with the limbs parallel to and between the seams 41 preferably have two separately controlled groups of needles, consisting of odd numbered and even numbered i.e. alternate needles respectively. When one row of bridges is met the sensing device causes the one of these sets of needles to lift while the other set continues sewing. When these bridges are passed the lifted set comes down again and both sets continue working until at the next row of bridges the cycle is repeated, but this time the other set of needles is lifted. If however the metallic pattern is thin enough, continuous sewing may be employed in which case the seams will continue through the bridge pieces as also shown in FIGURE 3 at 42. FIGURE 3 shows the meander pattern such as is made by expanding a foil according to my copending patent applications Serial Number 783,633, filed November 10, 1958 and Serial Number 789,221, filed December 29, 1958 on a single layer. Generally however the foil pattern would be sandwiched between two insulating layers. The same sensing device and procedure apply.

A heating cable as shown in FIGURE 4 having only a single insulating layer 25 can be made by a multi-needle machine able to do zig-zag stitching. Such a machine is able to sew parallel metal strips on to one insulating layer making alternate stitches 26, 27 right and left of each metal strip 28. If such a flat cable is passed through another multi-needle machine (or another sewing operation) making straight seams 29, a fairly strong fixing of the metal strips to the insulating layer is achieved and the first seams are secured. Alternatively another row 31 of zig-zag stitches can be sewn on the strips or a row 32 between the strips to secure the stitches of the rows which hold the strips.

The heat endurance of the insulating layer and thread material largely determines the maximum temperature at which the flat cable can be worked, provided that the metal strip permits of such temperature. Using the new synthetic textile fibres or glass fibre or quartz fibre for layer and thread results therefore in multicore cables of relatively high heat endurance.

It is quite possible to use metal strips which are coated with an organic enamel or sheathed in a plastic material which would not permit so called "high" temperature working of a multicore cable when such organic materials are used alone as the insulator, and still permit "high" temperature working of the cable of the invention, because the sewing in of the metal strips between "high" temperature enduring layers will create a solid barrier between adjacent metal strips, even if the organic insulating covering of the metal strips softens at the "high" temperature.

It is to be noted that the flat metal strips and the flat form of multicore cable permit very high heat dissipation and permit of a substantial saving in weight of metal if the metal strip is compared with the round wire conductor in a conventional round multicore cable.

As already stated, the metal strips of the tape cable of the invention are either flattened wires or strips of metal foil. These strips of metal foil may be produced by slitting a larger width of foil. The necessary lateral separation after slitting can be directly effected in the case of crimped or similar deformed foil, or if the foil is flat by loosely looping the strips around guides set an inclination to the direction of approach of the strips, or as described with reference to FIGURE 16 of British patent specification, No. 700,459. Or the strips may be produced by any other method usual in the production of parallel strips or parallel rows of metal on a very thin insulating base.

Naturally, one of the methods described in my copending applications Serial No. 783,633, filed November 10, 1958, and Serial No. 789,221, filed December 29, 1958, is used, the parallel metal strips will usually have integral interconnections (bridges). These patterns are fed to the sewing machine as a whole.

Sometimes however tape cables, that is rows of parallel metal strips on a flexible insulating tape (plastic film) are used for producing the heating structure. Their metal strips have no interconnections. They are treated like single foil strips, but it is not necessary to slit these films into strips containing one row each and feed them to the sewing machine separately; slitting can be omitted and the wide film with many rows can be fed as a whole. The needles can be relied on to pierce the plastic film between the conductive lines. The same can be done when the conductive lines are sandwiched between two plastic films or similar insulating layers.

The plastic film or films strengthen the seam in a similar way to an impregnating medium so that the thread cannot be readily pulled out. It would, of course, be desirable to anchor the stitches by other means as well, for instance by using lock-stitches instead of chain stitches in the sewing operation itself, though at the present time the multi-needle machines on the market generally only permit chain stitching. It is proposed to build machines which not only include two sets of needles which can stop and start sewing independently, but also permit lock-stitching, or production of wider structures so desirable for use under carpet runners, carpets, as linings for curtains, soft furnishings, etc.

When the metal strips are produced by slitting of a wider metal foil, the strips may be subject to secondary operations to round their edges. Their surface may be oxidized or plated or enamelled, as it is usual for equivalent wire cables. In some cases, for instance when the metal is aluminium, the strip surface may be so reliably oxidized that it can serve as an insulator having a breakdown voltage comparable to that of a plastic film, but of higher temperature endurance.

A main use of the flat cable of the present invention is for forming a heating element for resistance heating to low and medium temperatures as limited by the material of the insulating layer and thread. The tape cable itself forms part of a surface heating device which permits a number of improvements in surface heating and in the heating of liquids.

The flat metal strips which have a surface not much smaller than the surface of the cable itself and which are only separated from the cable surface by the thickness of the insulating material and the thickness of the direct insulating coating on the metal strip, if such direct insulation is provided at all, will therefore reach a temperature not much in excess of the temperature of the cable surface itself. Thus hot spots are not likely to occur and the metal strips are not likely to be exposed to great stresses due to wide temperature differences.

Nevertheless, it is preferred according to the invention to exclude the danger of exposing the metal strips to stresses caused by even the comparatively small temperature differences experienced or by mechanical handling of the cable (tension on the cable) and to enable an elastic cable to be produced. To achieve this the metal strip may be crimped i.e., embossed, knurled, or similarly deformed.

A much wider range of shaping of the metal strip is possible if forms of the cable which feature parallel rows of shaped metal strips are considered as distinct from parallel straight strips.

The shaped metal strip may have the form of a spirally wound strip or may be given a meander pattern by mechanical methods. Spirally wound strips may be produced by each strip being wound over a mandrel, and pressed flat again before being fed along with the other parallel strands through the multi-needle sewing machine.

The strips with a meander pattern as in FIGURES 2, 3, 5 or 6 may be produced by a punching tool, and this punching tool can, if desired, be arranged in front and in series with the multi-needle sewing machine which sews the meandered strips on to or between the insultaing tapes.

If metal strips made by a technique as in my aforesaid applications Serial Nos. 783,633 and 789,221 are used, the meander form is of course produced by the patterning operation, and the sewing machine is in this case fed from a reel of thin insulating film carrying parallel rows of patterned metal strips. The needle pierces the thin insulating film which extends between the rows of metal pattern when sewing the top and bottom layers together. This feature has already been referred to previously.

It has already been mentioned that it is possible to arrange for the metal pattern of the strips to intersect the seams, e.g. in the case of zig-zag stitches, so that the sewing actually takes place not, or not only, between the rows of parallel metal strips, but directly over these metal strips as well. Thus the metal strips themselves can be fixed by the threads to one or both insulating layers.

In one embodiment, for instance, it is proposed to arrange the punching of slots which form a meander pattern out of an originally straight metal strip so that the stitches are always effected through the punched slots near the inner end of the slots. If the inner ends are on the centre line of the metal strip a straight line of stitches can connect them all as at 19, 24, FIGURE 2. If they reach over the centre line it is preferable to have two straight lines of stitches 33 FIGURE 5 running parallel with the inner ends of these slots or to have zig-zag stitches 34 connecting all the inner ends of the slots.

A special form of meander pattern shown in FIGURE 6 can be made by punching or other technique from a straight metal strip so that the outer end of each slot does not separate the edge of the metal strip completely, but leaves a narrow bridge 35 connecting two branches of each meander along the edge of the metal strip. Such bridge very materially helps to keep the meander strip in shape for handling and feeding it through the machine, as the strip is actually a straight strip with perforations of a slot type. The shape of the slots is preferably tapered, the wide end 36 being formed by the narrow bridge. The wide end 36 and the apex 37 of the slot are rounded.

Such a strip can be held to the underlying insulating ribbon 42 by stitching 43 passing through the perforations, but in another embodiment a line of stitches 44 is made along both edges of the metal strips, and the sewn-on metal strips are usually used with one (bottom) textile ribbon only, their top surfaces being covered with a coating or left bare.

In some cases the metal is oxidized, in others provided with a good electrical contact surface, and these cables bare on one side may then be fixed on insulators for use, for instance wound around a glass tube to provide direct contact of the insulator with the metal strip. In other cases they are designed to touch electrical contacts at appropriate intervals.

Usually, however, a textile layer covers top and bottom of the metal strips and the primary insulation of the metal strips is on both sides of these strips. Strips which are produced as metallic strips on a thin insulating film are usually coated with an insulating film which comes on top of the metal strips before being fed to the sewing machine.

The preferred method of producing this strip which for the present purposes is essentially a pattern of parallel metal strips with integral connections (bridges) as in FIGURE 3 is described in my copending applications Serial No. 783,633, filed November 10, 1958 and Serial No. 789,221, filed December 29, 1958. It is therefore not necessary to repeat it here.

These patterns having integral interconnections of the parallel metal strips do not present the problem of how best to achieve interconnections in the production line. Only for the type of heating structure produced from a flat multicore cable with parallel unconnected metal strips does the problem arise. The following steps are therefore applicable only to this type except for the folding feature which may, if convenient, also be used with strips already cooperating in a meander pattern.

To appreciate the problem of providing the interconnections for the use of a flat multicore cable as a heating structure of the invention let it be assumed that no provision for terminals, bridge pieces, unitizing, etc., has been made and that all that is available is just a continuous length of parallel metal strips covered with plastic films and sewn in-between two textile layers. It would be a lengthly and troublesome task even to ascertain the resistance of the metal strips so as to determine the length to cut with sufficient precision. Then the cut ends have to be bared of insulation, etc.

For manual installation work it may be necessary to accept these operations, but for an automatic production line only the present invention provides a solution.

First the unitizing of the cable length: While the metal strips are fed to the sewing machine (or to an intermediary laminating machine) they run over rollers or other contacts of a resistance measuring device. This device sums the resistance measured between all adjacent contacts and activates a relay when a given preset value has been reached, not the unit value of resistance, but related to it and depending on the distance from the rollers to the point at which the controlled operations are performed. The position of the contacts on the strips which led to active response of the relay defines the centre line of what is hereafter called the bridge area. This area extends in the strip length direction to preferably more than twice the strip width on either side of the centre line.

The relay brings into operation the following actions on the strips while they are kept moving, whereby provision is made at the same location of each strip for contacting a number of conductors substantially over the whole of their widths without having to remove the insulating from the conductors. It will usually be desirable to make this provision on all of the strips but in some cases certain of the strips, for instance the two on the sides may be wanted as bus bars, or it may be desirable to make provision in a different form on these strips as will be explained below.

If the subsequent use makes it desirable or necessary the strips are hot tinned on one side or coated on one side with a solder paint over the whole bridge area.

Next each strip is folded four times in opposite directions as at 51, 52, 53, 54 FIGURE 7 to form what may be called two opposite Z formations, or separate attachments in the form of metal cover strips 55 FIGURE 8 are superposed over them along the bridge area and then secured at their ends i.e. at the edges of the bridges as at 56 to the strips of the cable. If the metals used and the operating temperature make it advisable, these cover strips can be spot welded to the cable strips, but if the metal and temperature permit, the cover strips can be soldered to the cable strips. The folded Z formations are preferred however to separate cover strips and they can be formed by the aid of simple tongue devices moved into the path of the cable strips, the loops so formed being pressed flat after the withdrawal of the tongues. Such Z formations increase the elasticity of the cable in the region of the bridge areas but do not affect the elasticity of the cable over its length as a whole. For the sake of clearness the Z formations are shown slightly open in the drawing.

The two outside cable strips alone may be folded first at 45° as at 57 FIGURE 9 then doubled as at 58 and then folded again at 45° as at 59. This produces a loop lying at right angles to the length of the strips which will subsequently protrude over the edge of the tape cable.

After this preparation of the bridge area the strips are laminated i.e. caused to adhere to plastic films or sewn directly between the textile layers. In some cases it is preferable to laminate the plastic films to the textile layer first, sew the metal strips or metal patterns between these plastic lined textiles and heat afterwards. This procedure seals the metal strips without covering the outside textile surface too much with plastics. The heating can be done when the cable is reeled up and/or by passing a current through the metal strips.

A multicore cable the metal strips of which have bridge areas or fitted as described can be cut at the centre line of any bridge area with a full knowledge of the resistance value of the cut length of heating structure without necessitating measurement or trials. The Z formations or attachments produce a slight local thickening of the cable which may form a sufficiently discernible indication of their locations but a more definite visible indication may be given for example by colouring the insulation, making an imprint or attaching a label. The value of the resistance may be included in the indication. Laterally projecting loops such as those of FIGURE 9 will also give a convenient indication.

When the cable has been cut the interconnections are readily made because either the single Z formation left after cutting or the severed cover strips give the effect of a split in depth of the conductor which provides limbs which can be opened to make the electrical connection without the need to remove insulation from the top and bottom of the conductor. When open they form a species of socket which will receive further strip connections. Their socket-like ends already tinned if permissible, are now readily interconnected by joining them directly, inserting sets of stamped U connectors, adhesive label connectors, etc., and the insulation is completed by a piece of adhesive tape or the like.

In the case of the Z formation instead of opening the socket, ends of the strips can simply be pulled out to be directly interconnected or form a species of plug to which connections can be made by a stamped U connector, an adhesive label connector or the like.

Terminal loops as in FIGURE 9 are of particular use when a number of heating cables are joined to bus bars. This can arise for instance when large pads or wide structures are being made. A narrow cable may be twice folded at 45° at intervals as at 61, 62 FIGURE 10 and neighbouring limbs so formed are sewn together at the adjacent edges to form a coherent fabric with the double folds 61, 62 and with the terminal loops which are indicated at 63 which are readily joined to a bus bar tape. The tape may be of the section shown in FIGURE 1 to allow for sewing at the edges. However most of the types of cable according to the invention can be assembled into wide fabrics but those with integral connections are preferred as they need not be cut if their terminals are accessible.

So far only metal strips which form a single layer have been mentioned. It is, however, possible to feed to the sewing machine parallel rows of patterned or straight metal strips in two or more layers. Each layer is separated from the next by a sheet or film of insulating material. The insulating material can be any flexible insulating substance and be a film of varnish, clear or pigmented, a film of plastic produced in any known way on the metal or self-supporting, a textile including glass fibre, a sheet of asbestos, paper, etc.

The superposed metallic layers of the several strips may have the same shape or differ in width and thickness or pattern. They may differ also in composition or type, for instance, one layer may be from a resistance metal foil such as cupro-nickel, while the superposed layer may be of aluminium foil anodized on the inner side. The aluminium foil may be earthed and thick enough (say 0.002 inch or more) to form a protective electric shield functioning like an earthed cable armouring although not enclosing the live conductor completely. This will substantially be the case however if there are two aluminium foil strips, one on each side of the live conductor strip.

The superposed layers form capacitors. An example reversing the function of a self healing capacitor in a heating appliance will be given later, but the form of construction can be used for any other heating applications as well.

Instead of separating the metallic layers by an insulating film or sheet, a semi-conductive material can be used as a separating film or medium. A film of resin pigmented with carbon or graphite with or without a supporting cloth with wide meshes is an example of a high resistance film which can be used as separator of a pair of superposed metallic strips.

If as shown in FIGURE 11 these metallic strips 45 are discontinuous, but staggered so that the discontinuities 46 of the one are overlapped by the intact metal portion of the other strip, a current path can be created which runs to and fro from one metal strip to the other through the carbon film 47 and therefore forms a high resistance path which is of great flexibility and owing to the thickness and large area of the whole structure is of good heat dissipation.

It is very often desirable to have the cable consisting of the two textile layers enclosing parallel rows of bare or enamelled metal strips which are separated from each other by the seams between the two textile layers impregnated or coated with an insulating compound, or imprinted or colour coated or protected by further sheets.

The impregnation or the coating can usually be done after the textile layers have passed the sewing machine, but wherever possible, textile layers which are already impregnated or printed or coated should be used.

If one of the textile layers has its outer surface coated with a pressure-sensitive adhesive a self-adhesive flat cable is obtained which is very easy to install or to fix on any wall or object, providing intimate contact all along its surface. This is very desirable for the use of the cable as a surface heater.

If the adhesive used is a thermo-setting adhesive, a permanent seal of the cable to the surface to which it is applied can be achieved.

For those applications where special elasticity and extensibility of the cable are required, elastic fabric is used as the insulating material and the impregnation or coating made from elastomeric materials (latex of natural or synthetic rubber, etc.) The metal strips for such cables are embossed, crimped, knurled, spiralled or of meander pattern as already described.

Armoured cables are made by enclosing the flat cable in sheets of metal foil or in thin metal sheets, preferably with a heat transfer compound of a jelly consistency at room temperature or with a grease so as to provide good heat transfer to the metal enclosure. The armour is usually earthed.

As already indicated, a main application of the cable described in such a variety of embodiments is its use as a surface heating element. The metal strips are connected in series or parallel and both ends of a piece of cable are sealed and terminals are provided.

The cable thus forms a heating cable or a part of a larger fabric for heating a surface evenly or selectively. Heating mantles, heating panels, heating blankets, heating carpets, heating pads, heating drums, heating curtains, etc. can all be made by assembling or sewing one or more heating cables of the types described together or on a supporting fabric, or sticking or otherwise fixing them on suitable surfaces.

The cable or a fabric made of it can be fixed as a filter in front of a fan to serve for heating the air flow and at the same time sifting out coarse dust. The cables can be made into ribbons to float in the air stream or to decorate a lighting fitting, a base board, etc. Using glass fibres they can be raised to medium temperatures and be stretched between rods, glass, tapes, ropes or other spacers to form the elements of a fixed or portable radiant and/or a convection heater.

There are on the market quite a range of heating appliances, featuring heating elements made from wires sewn or fixed by weaving or otherwise to glass fibre fabrics, or to rubber sheeting as the insulator and which may be classed as surface heaters. Devices of the same general character can be made by using the cable of the invention very much more cheaply and more efficiently than by such known methods.

But the cable of the invention goes much further. In the form of a self-adhesive cable it permits very intimate contact when for instance wound around a tube or stuck on to another surface to be heated. Very convenient de-icing devices for tubes or surfaces in the home, for the motor car or the aircraft and for instruments and industrial plants can be made with it. Flying suits are readily manufactured by sewing the cable on to the suits, and heating blankets or mattresses can be made by sewing the cables across the full sized sheet which is fixed to a pad, mattress or blanket. For the latter it is possible to use a heating cable featuring a two-layer metal strip with a resistive or temperature sensitive (thermoplastic) separation of the two layers, with the two metal layers not normally in the same circuit, one of them being earthed for example. Then if the temperature at any point rises sufficiently the resistance between the two-layers will fall either through the temperature effect on the sensitive separating layer or through the softening of it permitting direct contact between the metal layers, so that it is easy by a control of the resistance between the two layers to keep a watch over the intactness of the separation of the two metal strips along the whole length of the cable. As the insulation or resistance between the metal layers depends on the temperature, departure from tolerated temperature limits at any point or at all points can easily be detected. In this way, it is possible so to provide a temperature control over the whole length of the tape cable.

In addition to or instead of relying on and indicating the insulation breakdown of a thermoplastic film separating the two layers of metal strips, one of the layers, for instance the earthed one can be of metal or alloy which fuses at the critical temperature. A range of suitable alloys for both low and medium temperatures is well known. A small current is run through all the strips of this fusible layer connected in series with for instance one terminal earthed. A hot spot will interrupt this current by locally fusing the second layer and thus cause a relay to break the main circuit.

This safeguard can be additional to the one which causes a break in the main circuit when the insulating layer between the two metal strip layers breaks down, it is independent of the softening characteristics of this insulating layer and can therefore be used with any thin insulating layers. A combination of both safeguards can be provided by three layers or even by a double layer of metal strips of which one is of fusible metal the layers being separated by a thin thermoplastic insulating film. This will also safeguard against mechanical damage for instance by external forces causing either a break in the fusible layer or a contact between two metallic layers.

FIGURES 12 and 13 illustrate a multi-layer arrangement with protection as above mentioned, and also incorporating other features previously described. The figures are diagrammatic for the sake of clarity. Thus the thicknesses are greatly exaggerated, while the number of strips in the pattern is smaller than would usually be the case. The cable illustrated in cross section in FIGURE 12 includes two superposed patterns made up of crimped metal foil 65 constituting the lower layer which is the main heating pattern separated by insulation 66 from an upper pattern 67 and covered below by a further layer of insulation 68 and covered on top by another layer of insulation 69. A plastic insulation is here assumed which extends into the spaces between the arms of the patterns.

The lower layer 68 of insulation 67 carries a coat 71 of adhesive by which the cable can be secured in place.

The lower pattern 65 is connected through the contacts 72c of a circuit breaker to a main supply at 73. The upper layer pattern 67 is constantly supplied with a small current from a source indicated by a battery 76, the circuit of which also includes a relay winding 77w. Further one terminal of the upper pattern layer 67 is connected to earth through another relay winding 78w. The winding 72w of the circuit breaker is connected to the supply 73 but this circuit includes two contacts 77c and 78c in parallel controlled respectively by the relay windings 77w, 78w, the contact 77c being held open when the winding is excited, while the contact 78c is closed when the corresponding winding is excited. Under normal operation the winding 77w is excited by the current from the source 76, while no current flows through the winding 78w. Accordingly both contacts 77c, 78c are open and the circuit breaker winding 72w is unenergised. The circuit breaker contacts 72c are closed and the heating current flows normally through the pattern 65. If now the upper pattern 67 is broken the supply from the source 76 is interrupted, the relay 77 releases, the contact 77c closes, the circuit breaker is energised and the circuit through the pattern 65 is opened. This would happen if any part of the upper pattern which is made of fusible material should melt due to a hot spot or if the upper pattern is broken through mechanical damage. Again if the insulation between the two patterns should melt or otherwise allow contact through it the current from the lower pattern would flow through the upper pattern and the relay winding 78w. This could cause the relay contact 78c to close when again the circuit breaker would be energised cutting off the main supply from the lower pattern 65. It is further possible to provide one or more fusible sections such as 79 in the lower pattern which would constitute an additional protection should excessive current flow without the upper pattern being interrupted or connected to the lower pattern.

If a heating blanket is folded, while left switched on, it is quite possible that none of many thermostats fixed to it would be actuated by an intolerably high temperature being reached at one or more folds. This control of the whole length of the heating element has hitherto only been effected by electronic means. The present invention provides a means of simpler control by a multi-layer tape cable element such as described with reference to FIGURES 12 and 13.

A jelly filling of a hermetically sealed tape cable provides for construction of immersion heaters, utilizing the flat cable form. Heating cables for immersion in water or for soil heating are practicable. If instead of a metal sheath, plastic or rubber is used as an enclosure for the cable, it becomes suitable for use for immersion heaters for acids and alkalies. The advantages are great surface, small temperature gradient, flexibility and lightness, together with low cost. Suitable plastics are among others polyvinyl chloride, polycarbonate and terylene. Flat cables impregnated with or enclosed in polythene and irradiated would prove a particularly useful heating device for plating baths of all types.

I claim:

1. An electrical resistance heating structure of small width and great length comprising at least one group of separate thin metallic conductors extending continuously and parallel to the length of the structure, thin transverse interconnections between the conductors at intervals, thereby forming a succession of elongated meandering patterns, at least one thin flexible insulating layer having a width at least equal to the width of the pattern, and stitches of insulating thread passing through the insulating layer and holding the pattern in place thereon.

2. An electrical resistance heating structure according to claim 1 having the conductors sandwiched between two insulating layers of equal width but arranged in a staggered relationship so that the edge of one layer projects beyond the other on both sides of the heating structure.

3. An electrical resistance heating structure according to claim 1 in which the stitches are of resin-coated glass fibre.

4. An electrical resistance heating structure according to claim 1 in which the insulating layer is of fibrous nature, the heating structure also including a plastic insulating film between the conductors and the insulating layer.

5. A flat electric flat cable comprising at least one thin flexible prefabricated insulating layer of small width and great length and at least two separate longitudinal conductor strips extending continuously and parallel to the length of said layer each consisting of crimped metal foil of thin wide cross section with crimps perpendicular to the plane of the cable to give the foil extensibility in the longitudinal direction without reduction of its cross section, all of said strips being secured to the same surface of said insulating layer.

6. A flat electric tape structure according to claim 5 having the crimped foil conductor strips sandwiched between two plastic insulating films with the plastic material extending into the gaps between the conductor strips.

7. An elastic electrical resistance heating structure in the form of a flat cable according to claim 5 in which the insulating layer is of elastomeric character.

8. An electrical resistance heating structure in the form of a flat cable of great length, comprising at least two superposed layers of conductor strips extending over the length of the cable and consisting of crimped metal foil of thin wide cross section with crimps of such nature as to give the foil extensibility in the longitudinal direction without reduction of its cross section, separate terminal areas on each layer of conductors, at least one of the layers including at least at intervals a portion of at least one of its conductors which is fusible at a predetermined safe temperature, an insulating film separating each two adjacent layers of conductors and at least one flexible insulating layer of small width supporting the conductor and insulating film.

9. A heating system including an electrical resistance heating structure according to claim 8 having the conductors of the layer including the fusible portions connected in series, means normally causing a small current to flow through the conductors of said last mentioned layer, a relay also traversed by this current and means actuated by the relay to open the supply to the structure if the said small current is stopped from flowing through interruption of the conductors of said last mentioned layer.

10. An electrical resistance heating structure in the form of a flat cable of great length comprising at least two superposed layers of metallic conductors extending continuously in the longitudinal direction, each conductor consisting of crimped metal foil of thin wide cross section with crimps of such nature as to give the foil extensibility in the longitudinal direction without reduction of its cross sections, separate terminal areas on each layer of conductors, a thin insulating film separating each two adjacent layers of conductors, said film being thermoplastic and softening at a predetermined safe temperature, and at least one flexible insulating layer supporting the conductors and insulating film.

11. A heating system including an electrical resistance heating structure according to claim 10, a current actuated circuit breaking device, a lead from one of the layers of conductors to earth in which said circuit breaker device is included, so that the circuit breaking device is actuated if a drastic reduction in resistance occurs between this layer of conductors and another layer of conductors at any point in the length of the structure.

12. An electrical resistance heating structure according to claim 1 provided on at least one surface with an adhesive coating.

13. A heating appliance comprising a short piece of the structure according to claim 1 extended between insulating members of fibrous structure.

14. A method of making an electrical resistance heating structure in the form of a flat cable by sewing an elongated meandering pattern of thin longitudinal metallic foil conductors joined by transverse interconnections to an insulating tape, which includes the step of feeding said foil pattern and insulating tape forward together, and simultaneously making a plurality of longitudinal rows of stitches passing through said insulating tape in the gaps of the patteren by means of a plurality of needles, said needles being arranged with alternate needles in two groups, each group being separately controllable and cooperating with a sensing device which when the respective group of needles reaches a row of interconnections between the longitudinal conductors lifts that group out of action until the interconnections have been passed.

15. The method of making a flat electrical resistance heating cable which includes the steps of making longitudinal slits in and crimping a wide foil by creating undulations in the foil which substantially reduce its length as compared with its original length but without substantially reducing its cross section, expanding the foil laterally thereby separating the strips of foil defined by the slits, and sewing the expanded foil to an insulating layer.

References Cited in the file of this patent

UNITED STATES PATENTS

| | | |
|---|---|---|
| 1,375,863 | Stanton | Apr. 26, 1921 |
| 2,110,660 | Doczekal | Mar. 8, 1938 |
| 2,284,673 | Munschak | June 2, 1942 |
| 2,559,077 | Johnson et al. | July 3, 1951 |
| 2,569,138 | Abbott | Sept. 25, 1951 |
| 2,570,376 | Quist | Oct. 9, 1951 |
| 2,627,012 | Kinsella et al. | Jan. 27, 1953 |
| 2,745,942 | Cohen | May 15, 1956 |
| 2,845,519 | Willat | July 29, 1958 |

FOREIGN PATENTS

| | | |
|---|---|---|
| 503,765 | Great Britain | Apr. 11, 1939 |
| 414,818 | Italy | Aug. 31, 1946 |